United States Patent
Adachi et al.

(10) Patent No.: US 6,194,069 B1
(45) Date of Patent: Feb. 27, 2001

(54) PROCESS FOR THE PRODUCTION OF COATED PARTICLES

(75) Inventors: Tatsuhiko Adachi; Kazuhiko Sakai; Norihiro Nakayama; Kenichi Fujino; Hidekazu Takagi, all of Gifu (JP)

(73) Assignee: Ube Nitto Kasei Co., Ltd., Tokyo (JP)

( * ) Notice: Subject to any disclaimer, the term of this patent is extended or adjusted under 35 U.S.C. 154(b) by 0 days.

(21) Appl. No.: 09/363,398

(22) Filed: Jul. 29, 1999

Related U.S. Application Data

(62) Division of application No. 08/684,745, filed as application No. PCT/JP95/00006 on Jan. 6, 1995, now Pat. No. 6,013,369.

(30) Foreign Application Priority Data

Nov. 21, 1994 (JP) .................................... 6-286516
Nov. 22, 1994 (JP) .................................... 6-288073

(51) Int. Cl.⁷ ................................ B32B 5/16; B05D 1/36
(52) U.S. Cl. ......................... 428/403; 427/212; 427/335; 427/344; 427/372.2; 427/376.1; 427/376.2; 427/376.6; 427/380; 427/419.2; 427/419.3; 428/404
(58) Field of Search .................................. 428/403, 404; 427/213.31, 215, 372.2, 376.1, 376.6, 335, 344, 376.2, 380, 419.2, 419.3

(56) References Cited

U.S. PATENT DOCUMENTS

| | | | |
|---|---|---|---|
| 3,887,740 | * 6/1975 | Foster et al. | 428/116 |
| 4,146,403 | 3/1979 | Armanini et al. | 106/291 |
| 4,344,987 | 8/1982 | Ostertag et al. | 427/213 |
| 4,789,563 | 12/1988 | Stevens | 427/252 |
| 5,098,740 | * 3/1992 | Tewari | 427/215 |
| 5,112,676 | 5/1992 | Cot et al. | 427/226 |
| 5,156,889 | 10/1992 | DeLuca, Jr. | 427/215 |
| 5,603,983 | 2/1997 | Clough et al. | 427/126.3 |

FOREIGN PATENT DOCUMENTS

| | | |
|---|---|---|
| 62-40292 | 8/1987 | (JP) . |
| 63-89890 | 4/1988 | (JP) . |
| 3-279209 | 12/1991 | (JP) . |
| 5-9027 | 1/1993 | (JP) . |
| 5-257150 | 10/1993 | (JP) . |
| 6-162817 | 6/1994 | (JP) . |

* cited by examiner

Primary Examiner—H. Thi Le
(74) Attorney, Agent, or Firm—Nixon & Vanderhye

(57) ABSTRACT

A process for the production of insulator-coated black particles, which comprises the steps of (1-a) dispersing particles of silica or a metal oxide in an alcohol-based solvent consisting mainly of an intermediate alcohol to obtain a dispersion of the above particles, (1-c) forming a titanium oxide coating of $TiO_2$ on the surface of each of the particles whose surfaces have been activated in the above step, to obtain titanium oxide-coated particles, (1-d) calcining the titanium oxide-coated particles obtained in the above step in a reducing and/or nitriding atmosphere and thereby blackening the above titanium oxide coatings to obtain black particles, and (1-e) forming an electrical insulator coating on a surface of each of the black particles obtained in the above step, to obtain insulator-coated black particles; characterized in that the process includes a step of (1-b) adding an alkaline aqueous solution to the dispersion obtained in step (1-a) to activate a surface of each of the particles of a metal oxide.

15 Claims, 1 Drawing Sheet

PROCESS FOR THE PRODUCTION OF COATED PARTICLES

This is a division of application Ser. No. 08/684,745, filed Jan. 22, 1996, now U.S. Pat. No. 6,013,369, which is a 35 U.S.C. § 371 of PCT/JP95/00006, filed Jan. 6, 1995,the entire content of which is hereby incorporated by reference in this application.

TECHNICAL FIELD

The present invention relates to a process for the production of coated particles, particularly to a process for the production of electrically conductive particles obtained by imparting electrical conductivity to a titanium oxide coating formed on each of inorganic particles and a process for the production of insulator-coated particles obtained by forming an electrically insulating coating on each of the above electrically conductive particles.

TECHNICAL BACKGROUND

In a TN (twisted nematic) type liquid crystal display device, variations in the gap of a liquid crystal cell have an immense influence on display qualities such as a response speed, a viewing angle and a contrast, and cause a display nonuniformity. In an STN (super twisted nematic) type liquid crystal display device, it is considered that the variations in the gap of a liquid crystal cell is required not to exceed 0.05 μm, and the accuracy of a spacer dominates the display qualities to a great extent.

The variations in the gap of a liquid crystal cell can be decreased by increasing the dispersion density of a spacer dispersed in the liquid crystal cell. By this means, however, the leakage of light from a spacer increases if the spacer has light transmittance properties. It is therefore general practice to color the spacer itself in black, or the like, for preventing the light transmittance through the spacer.

The above technique includes a method in which an organic substance is introduced into metal oxide fine particles obtained by hydrolysis of a metal alkoxide such as silica fine particles, in the presence of an alkali metal and the resultant product is treated at a temperature of at least 250° C. to blacken it as proposed in JP-A-63-89890 or a method in which silica fine particles are brought into contact with a fluorinating agent and an organic solvent to introduce an organic substance into the silica fine particles and the resultant product is heated to 500° C. or higher to blacken it as proposed in JP-A-3-279209.

In the method disclosed in JP-A-63-89890, however, it is difficult to control the residual amount of the organic substance and it is therefore difficult to adjust the blackness. Further, since the alkali metal used for introducing the organic substance into the silica fine particles is together taken into the silica fine particles, it is required to extract and remove the alkali metal taken into the silica fine particles by bringing the silica fine particles into contact with a mineral acid after the introduction of the organic substance. Further, the method disclosed in JP-A-3-279209 has a problem that hydrofluoric acid is generated at a heating time so that the material of a calcining furnace is corroded to cause the inclusion of impurities.

In view of these points, the present inventors sought to develop a method in which an alkali metal is not taken into a spacer and no corrosive gas occurs at a calcining time. As a result, it was found that black fine particles can be obtained by adding a titanium compound (titanium alkoxide, etc.) which is formable into an titanium oxide coating on the surface of silica fine particles to a dispersion of silica fine particles in a water-alcohol solvent, hydrolyzing the titanium compound to form a titanium oxide coating on each silica fine particle, separating the titanium oxide-coated silica fine particles from the solvent, then freeze-drying the titanium oxide-coated silica fine particles and calcining them in a reducing atmosphere such as ammonia gas to blacken the above titanium oxide coatings, and it was proposed to use the so-obtained black fine particles as a spacer for a liquid crystal display device (Japanese Patent Application No. 3-184002 (JP-A-5-9027)).

In the method disclosed in the above JP-A-5-9027, when the time for reduction-treating the titanium oxide coatings in an ammonia gas atmosphere is increased or when the reduction-treating temperature is increased to obtain black fine particles having a higher blackness, the amount of a formed titanium nitride increases. As a result, the resultant black fine particles have decreased electrical insulation properties and comes to show electrical conductivity. The present inventors therefore sought to develop black fine particles having higher electrical insulation properties. As a result, it was found that black fine particles having a high blackness and excellent electrical insulation properties (black fine particles each of which is provided with an electrically insulating coating will be referred to as "insulator-coated black particles" hereinafter) can be obtained by hydrolyzing and polycondensing a metal alkoxide, etc., in a water-alcohol solvent in the presence of ammonia to form an electrically insulating coating of a metal oxide (silica, etc.) on the surface of each of black fine particles produced according to the method disclosed in the above JP-A-5-9027. The use of the above insulator-coated black particles as a spacer for a liquid crystal display device was also proposed (JP-A-5-257150).

Further, although not directly intending to obtain a spacer for a liquid crystal display device, the present inventors developed a method which enables the production of electrically conductive fine particles, comprising calcining a titanium oxide coating formed on the surface of each of metal oxide particles in a reducing and/or nitriding atmosphere to converting the titanium oxide coating to an electrically conductive coating containing partially reduced titanium and/or titanium nitride, wherein the titanium oxide coating formed on the surface of each particle by one reaction has a greater thickness than the coating formed by the method disclosed in the above JP-A-5-9027 and the adhesion between the above coating and each particle is higher than the adhesion between each particle and the titanium oxide coating turned black in the black fine particles obtained by the above JP-A-5-9027. The use of the electrically conductive fine particles obtained by the above method in an anisotropic electrically conductive film or the like was proposed (JP-A-6-162817).

In the method disclosed in the above JP-A-6-162817, electrically conductive fine particles as an end product are obtained as follows. Particles of a metal oxide are dispersed in an alcohol-based solvent mainly containing an intermediate alcohol having 4 to 10 carbon atoms, an alkaline aqueous solution is added to the dispersion to activate the particle surfaces, a titanium compound which can form a titanium oxide is added to the mixture, the titanium compound is hydrolyzed to form a titanium oxide coating on each of the above particles, then, the solid and the liquid are separated from each other, the solid is freeze-dried to obtain titanium oxide-coated particles, and the titanium oxide-coated particles are calcined in a reducing and/or nitriding atmosphere to form coatings containing partially reduced titanium oxide and/or titanium nitride.

Meanwhile, a spacer for a liquid crystal display device is required to have excellent electrical insulation properties for preventing useless conduction among a great number of electrodes provided in a liquid crystal cell. It is therefore improper to use the electrically conductive fine particles obtained by the method disclosed in the above JP-A-6-162817 as a spacer for a liquid crystal display device. Further, the insulator-coated black particles disclosed in the above JP-A-5-257150 are suitable as a spacer for a liquid crystal display device in respect of electrical insulation properties since they have electrically insulating coatings. Since, however, the titanium oxide coating formed on each particle by one reaction in the production process thereof has a small thickness, the productivity is low when it is attempted to finally produce insulator-coated black particles having a high blackness by forming titanium oxide coatings having a large thickness. The same is also true of the method disclosed in JP-A-5-9027. A titanium oxide coating having a large thickness can be formed by the method disclosed in the above JP-A-6-162817. As already described, however, it is the method of producing electrically conductive fine particles that is disclosed in the above publication.

Further, with regard to a titanium oxide coating formed on each of particles, the titanium oxide coating is increasingly desired to be denser and to have a larger thickness. With regard to a case where electrical insulation properties are imparted on the basis of an electrically insulating coating, it is also increasingly desired to form a denser electrically insulating coating having a larger thickness for obtaining higher electrical insulation properties.

It is a first object of the present invention to provide a process for the production of insulator-coated black particles in which a titanium oxide coating formed on the surface of each particle by one reaction has a large thickness and finally obtained particles have a high blackness.

It is a second object of the present invention to provide a process for the production of black particles each of which has a blackened titanium oxide coating which is denser and has a large thickness.

DISCLOSURE OF THE INVENTION

For achieving the above first object, the process for the production of insulator-coated black particles, provided by the present invention, comprises the steps of (1-a) dispersing particles of a metal oxide in an alcohol-based solvent consisting mainly of an intermediate alcohol to obtain a dispersion of the above particles, (1-b) adding an alkaline aqueous solution to the dispersion obtained in the above step to activate a surface of each of the above particles, (1-c) forming a titanium oxide coating of $TiO_2$ on the surface of each of the particles whose surfaces have been activated in the above step, to obtain titanium oxide-coated particles, (1-d) calcining the titanium oxide-coated particles obtained in the above step in a reducing and/or nitriding atmosphere and thereby blackening the above titanium oxide coatings to obtain black particles, and (1-e) forming an electrical insulator coating on a surface of each of the black particles obtained in the above step (the above process will be referred to as "Process I" hereinafter).

For achieving the above first object, the other process for the production of insulator-coated black particles, provided by the present invention, comprises the steps of (2-a) dispersing particles of a metal oxide in an alcohol-based solvent consisting mainly of an intermediate alcohol to obtain a dispersion of the above particles, (2-b) adding an alkaline aqueous solution to the dispersion obtained in the above step to activate a surface of each of the above particles, (2-c) forming a titanium oxide coating of $TiO_2$ on the surface of each of the particles whose surfaces have been activated in the above step, to obtain titanium oxide-coated particles, (2-d) forming an electrical insulator coating on a surface of each of the titanium oxide-coated particles obtained in the above step, to obtain insulator-coated particles, and (2-e) calcining the insulator-coated particles obtained in the above step in a reducing and/or nitriding atmosphere and thereby blackening the above titanium oxide coatings constituting the insulator-coated particles, to obtain insulator-coated black particles (the above process will be referred to as "Process II" hereinafter).

On the other hand, for achieving the above second object, the process for the production of black particles, provided by the present invention, comprises the steps of (3-a) dispersing particles of a metal oxide in an alcohol-based solvent consisting mainly of an intermediate alcohol to obtain a dispersion of the above particles, (3-b) adding an alkaline aqueous solution to the dispersion obtained in the above step to activate a surface of each of the above particles, (3-c) forming a titanium oxide coating of $TiO_2$ on the surface of each of the particles whose surfaces have been activated in the above step, to obtain titanium oxide-coated particles, and (3-d) calcining the titanium oxide-coated particles obtained in the above step in a reducing and/or nitriding atmosphere and thereby blackening the above titanium oxide coatings to obtain black particles, wherein the step (3-c) comprises adding titanium alkoxide or a partial hydrolyzate thereof to the dispersion of the particles whose surfaces have been activated in the above step (3-b), hydrolyzing and dehydratively condensing the titanium alkoxide or the partial hydrolyzate thereof to form a titanium oxide coating on the surface of each of the particles, separating the titanium oxide-coated particles from the dispersion, dispersing the titanium oxide-coated particles in neutral water, heat-treating the resultant mixture, separating the titanium oxide-coated particles from the above neutral water and treating the titanium oxide-coated particles under dry heat (the above process will be referred to as "Process III" hereinafter).

PREFERRED EMBODIMENTS FOR WORKING THE INVENTION

Figure 1:
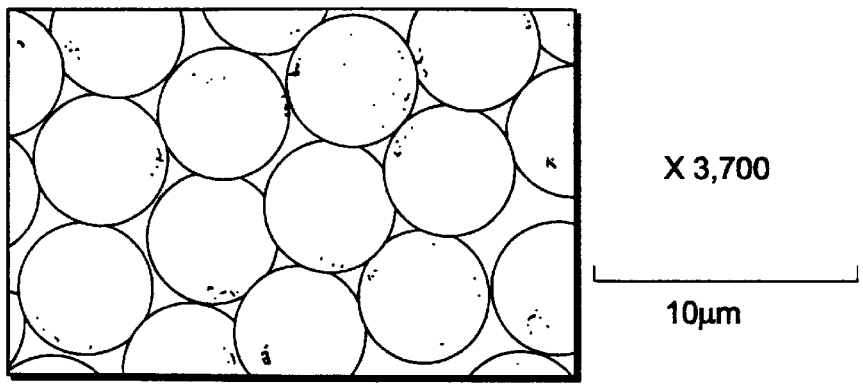
FIG. 1 is a schematic showing of a scanning electron microscope (SEM) photograph of titanium oxide-coated particles obtained in Example 7 to be described later.

First, Process I of the present invention will be explained hereinafter.

In Process I, the step (1-a) is a step in which particles of a metal oxide are dispersed in an alcohol-based solvent consisting mainly of an intermediate alcohol, to obtain a dispersion of the particles. The particles used in this step have a particle diameter, generally, in the range of from 0.5 to 30 μm, preferably in the range of from 1.0 to 15 μm. Further, particularly preferred are spherical particles whose particle diameter distribution shows a monodisperse property. The term "spherical" does not refer to a "sphere" alone in a strict sense, but means that the particles may have a form deformed from "sphere" so long as the use thereof in the fields of coated particles is not hampered.

The above spherical particles include fine particles of silica, titania, zirconia, barium oxide, iron oxide, cobalt oxide, chromium oxide, vanadium oxide, hafnium oxide, magnesium oxide or strontium oxide. It is particularly preferred to use silica fine particles in view of particle diameter accuracy, strength and hardness.

Silica fine particles are produced by hydrolyzing and dehydratively polycondensing a silicon alkoxide in a reaction solution containing water, ammonia and an alcohol. Non-calcined silica fine particles at this stage have low strength and hardness, since they have many silanol groups and contain a considerable amount of residual organic substance, water and ammonia. When the non-calcined silica fine particles are calcined at 500–1,200° C., the organic substance and water volatilize, and further, the silanol groups undergo mutual condensation to increase siloxane bonds and to increase the strength and hardness, while silanol groups on the surface are used for the condensation and considerably decrease in number. The above two kinds of silica fine particles can be used in Process I of the present invention.

In the step (1-a), the above particles are dispersed in an alcohol-based solvent to obtain a dispersion of the particles. The alcohol-based solvent is limited to a solvent consisting mainly of an intermediate alcohol having 4 to 10 carbon atoms such as butanol, pentanol, hexanol, heptanol, octanol, nonanol or decanol. The reason therefor is as follows. That is, titanium alkoxide has a higher hydrolysis rate than silicon alkoxide. When a lower alcohol is used as a solvent, titanium oxide is formed in the solvent before the formation of titanium oxide on the particle surfaces, and titanium oxide particles are liable to be formed in the solvent. In contrast, when an alcohol-based solvent consisting mainly of an intermediate alcohol is used, the hydrolysis of titanium alkoxide in the solvent is inhibited and the hydrolysis preferentially takes place on the particle surfaces, so that a titanium oxide coating formed in the step (1-c) to be described later has a large thickness.

The above intermediate alcohol may be any one of linear and branched alcohols, and linear and branched alcohols may be used alone or in combination. Further, in addition to the above intermediate alcohol, the alcohol-based solvent may contain a small amount (e.g., less than 20 vol%) of a lower alcohol such as methanol, ethanol or propanol or a hydrophilic solvent such as acetonitrile, THF, DMF and DMSO.

The step (1-b) which comes next is a step in which an alkaline aqueous solution is added to the dispersion of the particles, obtained in the above step (1-a), to activate the surface of each particle. This activation is a treatment to promote the dissociation of proton from silanol groups on the surface by working an alkali on the surface of each particle. The activation treatment improves not only adhesion between a titanium oxide coating to be formed in the step (1-c) to be described later and each particle, but also adhesion between a black coating of partially reduced titanium oxide and/or titanium nitride to be formed in the step (1-d) to be described later, so that the peeling and the cracking of the coating are prevented. In particular, when silica fine particles are used as particles, there is an old problem that the coating undergoes peeling or cracking because of the large difference in the ratios of contractivity by heat between silica and titanium oxide under the calcining treatment in the step (1-d) to be described later, while the above activation treatment can solve this problem.

The alkaline aqueous solution used in the activation treatment is preferably selected from alkaline solutions of ammonia, alkali metal hydroxide, alkaline earth metal hydroxide, alkali metal salt, or alkaline earth metal salt. It is particularly preferred to use aqueous ammonia.

The step (1-c) which comes next is a step in which a coating of titanium oxide of $TiO_2$ (titanium oxide formed of stoichiometric amounts of titanium and oxygen) is formed on the surface of each of the particles whose surfaces have been activated in the above step (1-b).

The formation of the titanium oxide coating in the step (1-c) is carried out by hydrolyzing and dehydratively condensing titanium alkoxide or its partial hydrolyzate in the dispersion of the particles whose surfaces have been activated in the above step (1-b). The titanium alkoxide has the general formula,

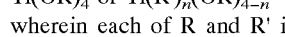

$Ti(OR)_4$ or $Ti(R')_n(OR)_{4-n}$ wherein each of R and R' is an alkyl group or an acyl group, particularly an alkyl group having 1 to 5 carbon atoms or an acyl group having 2 to 6 carbon atoms, and n is an integer of 1 to 3.

Specific examples of R and R' include methyl, ethyl, linear or branched propyl, linear or branched butyl, linear or branched pentyl, acetyl and propionyl. The partial hydrolyzate of titanium alkoxide includes a product obtained by partially hydrolyzing the titanium alkoxide of the above general formula.

The above titanium alkoxide or its partial hydrolyzate added to the dispersion is hydrolyzed by a so-called sol-gel method to form a titanium oxide coating on the surface of each particle. Although properly determined depending upon a purpose, the thickness of the titanium oxide coating is generally 0.01 to 1 μm. In Process I, the step (1-a) uses an alcohol-based solvent consisting mainly of an intermediate alcohol having 4 to 10 carbon atoms. Therefore, Process I is advantageous in that the thickness of the titanium oxide coating obtained by one reaction is greater than the thickness of a titanium oxide coating obtained by any one of the methods disclosed in the publications of the above JP-A-5-9027 and JP-A-5-257150.

The step (1-d) which comes next is a step in which the titanium oxide-coated particles obtained in the above step (1-d) are calcined in a reducing and/or nitriding atmosphere to reduce and/or nitride the titanium oxide coating, whereby the titanium oxide coating is blackened. In the step (1-d), the reducing atmosphere is achieved by the use of a reducing gas such as hydrogen gas, and the nitriding atmosphere is achieved by the use of a nitriding gas such as nitrogen gas. Further, the reducing and nitriding atmosphere can be also achieved by the use of ammonia gas which is both a reducing gas and a nitriding gas, or by the use of hydrogen gas and nitrogen gas in combination.

The calcining is generally carried out in a high-temperature furnace, and the temperature therefor is generally in the range of from 800 to 1,000° C. In the calcining treatment in the above reducing and/or nitriding atmosphere, the titanium oxide coating is converted to partially reduced titanium oxide of the formula $TiO_n$ (1.5<n<2, preferably 1.6<n<1.9) and/or titanium nitride of TiN, whereby the titanium oxide coating is blackened.

The step (1-e) is a step in which an electrical insulator coating is formed on the surface of each of the black particles obtained in the above step (1-d). The electrical insulator coating is not specially limited in kind so long as it is a metal oxide having electrical insulation properties, while a silica coating is preferred since it is excellent in chemical durability and heat stability. The electrical insulator coating of silica can be formed, for example, by mixing a silicon alkoxide (e.g., tetraalkoxysilane) with the above black particles in a solvent having a water-alcohol system whose pH is adjusted to an alkali side with ammonia, thereby activating the silicon alkoxide with the above ammonia, and simultaneously hydrolyzing and dehydratively polycondensing the silicon alkoxide.

The thickness of the electrical insulator coating is not specially limited so long as the black particles can be imparted with electrical insulation properties, while it is preferably 0.05 to 0.5 μm.

After the insulator-coated black particles is obtained by forming the above electrical insulator coating, the insulator-coated black particles may be again calcined in a reducing and/or nitriding atmosphere for preventing the re-oxidation of the black coatings (blackened titanium oxide coatings).

When the above calcining treatment is not carried out, the silica coating formed as an electrical insulator coating has many silanol groups since it is not calcined. Owing to these silanol groups on the surface, the silica coating can be easily surface-treated with a silane coupling agent such as vinyltriethoxysilane, methacryloxypropyltrimethoxysilane, γ-aminopropyltriethoxysilane, methyltrimethoxysilane or methyltriethoxysilane. Therefore, when a spacer for a liquid crystal display device is wet-applied, the insulator-coated black particles can be surface-modified to increase the dispersibility depending upon the hydrophilic nature or lipophilic nature of a solvent in which the insulator-coated black particles are to be dispersed. The insulator-coated black particles can be also imparted with high flowability of a powder required for dry application, Further, a reactive terminal group can be introduced to graft-polymerize the monomer, and the particles can be coated as a resin.

The insulator-coated black particles obtained by carrying out the Process I comprising the above steps (1-a) to (1-e) have the following features, and can be suitably used as a spacer for a liquid crystal display device. (i) The insulator-coated black particles have sufficient shading properties since each black coating formed by reducing and/or nitriding the titanium oxide coating has a large thickness and a high blackness and since the black coatings undergo almost no cracking or peeling.

(ii) The insulator-coated black particles are excellent in electrical insulation properties since an electrical insulator coating is formed on each black coating.

Further, for obtaining insulator-coated black particles each of which has a denser black titanium oxide coating, the step (1-c) for obtaining the titanium oxide-coated particles is preferably carried out as follows.

That is, the titanium alkoxide or its partial hydrolyzate is added to the dispersion of the particles whose surfaces have been activated in the above step (1-b), the titanium alkoxide or the partial hydrolyzate is hydrolyzed and dehydratively condensed to form a titanium oxide coating on each of the above particles, the resultant titanium oxide-coated particles (the titanium oxide-coated particles at this stage will be referred to as "titanium oxide-coated particles A" hereinafter) are separated from the above dispersion, dispersed in neutral water and heat-treated, and then, the titanium oxide-coated particles are separated from the above neutral water and treated under dry heat, whereby the intended titanium oxide-coated particles (these titanium oxide-coated particles will be referred to as "titanium oxide-coated particles B" hereinafter) are obtained (this step will be referred to as step (1-c2) hereinafter).

The titanium oxide-coated particles A are separated from the dispersion by a decantation method, a centrifugal separation method or a filtering method.

In one embodiment of the separation by a decantation method, there is a method in which a dispersion of the particles whose surfaces are coated with titanium oxide is allowed to stand to precipitate the titanium oxide-coated particles A, a supernatant is removed by tilting a container, a lower alcohol such as methanol is added, the particles are dispersed therein, the resultant dispersion is again allowed to stand to precipitate the titanium oxide-coated particles A, the container is tilted to remove the washing methanol, neutral water such as pure water is used to repeat the same procedure, then the container is tilted to remove the wash water, this procedure using water is repeated several times, and finally the wash water is removed by tilting the wash water.

In one embodiment of the separation by a centrifugal method, there is a method in which a dispersion of the particles whose surfaces are coated with titanium oxide is separated into a precipitate of the titanium oxide-coated particles A and a supernatant with a centrifuge, then, the supernatant is removed, a lower alcohol such as methanol is added, the particles are re-dispersed by ultrasonic treatment, and these procedures are repeated several times thereafter. During the above procedures, the lower alcohol solvent such as methanol can be replaced with water.

In one embodiment of the separation by a filtering method, there is a method in which a dispersion of the particles whose surfaces are coated with titanium oxide is filtered through an olefin-based or fluorine resin-based membrane filter (pore diameter 1–20 μm) under elevated pressure or reduced pressure collect the titanium oxide-coated particles A on the above filter, and then washed with a lower alcohol such as methanol and with neutral water with filtering.

After the separation of the titanium oxide-coated particles A from the dispersion, the dispersing of the titanium oxide-coated particles A into neutral water and the heat treatment thereof are preferably carried out by pouring the titanium oxide-coated particles A into neutral water such as pure water, stirring the mixture, and heating the mixture at 50 to 90° C. for 30 minutes to 4 hours. This heat treatment completes the hydrolysis, and a titanium oxide coating containing unreacted substance decreased in amount is obtained.

The heat-treated titanium oxide-coated particles A can be separated from the above neutral water by any one of the above decantation method, centrifugal separation method and filtering method. The treatment under dry heat thereafter is preferably carried out, e.g., at a temperature of 150 to 250° C. for 30 minutes to 4 hours, whereby the titanium oxide coatings are densified and flatened.

The procedures up to the above treatment under dry heat give the intended titanium oxide-coated particles B. Each of the titanium oxide-coated particles B has a denser titanium oxide coating. Further, as required, the above steps (1-a), (1-b) and (1-c2) may be repeated once or at least twice using the titanium oxide-coated particles B as a starting material, to increase the thickness of each titanium oxide coating, for obtaining titanium oxide-coated particles having by far denser and thicker titanium oxide coatings.

The above steps (1-a), (1-b) and (1-c2) are preferably repeated once to four times. The specific contents of the steps (1-a), (1-b) and (1-c2), which may be repeated, are already explained, and the explanation thereof is omitted.

When the above step (1-c2) is carried out in place of the step (1-c), folowing technical effects can be obtained.

(i) A titanium oxide coating having a larger thickness can be obtained due to the use of the alcohol-based solvent consisting mainly of an intermediate alcohol in the step (1-a) and due to the repetition of the steps (1-a), (1-b) and (1-c).

(ii) A densified and surface-flattened titanium oxide coating can be obtained due to the heat treatment in neutral water and the treatment under dry heat in the step (1-c2).

(iii) When the above steps (1-a) to (1-c2) are repeated to increase the thickness of the titanium oxide coating, since the titanium oxide coating is densified and surface-flattened, the cracking of the titanium oxide coating as an undercoating to cause the peeling of the titanium oxide coating is prevented when the particles are brought into contact with an alkaline aqueous solution in the step (1-b). Therefore, the titanium oxide coating can be easily increased in thickness.

(iv) Since the titanium oxide coating is densified and flattened, the titanium oxide-coated particles B have high monodisperse properties (CV value (coefficient of variation) of particle diameter distribution is decreased).

An electrical insulator coating is formed on the surface of each of the titanium oxide-coated particles B having the above technical effects according to the above step (1-e), whereby insulator-coated black particles having denser blackened titanium oxide coatings can be obtained. The so-obtained insulator-coated black particles can be also suitably used as a spacer for a liquid crystal display device.

On the other hand, for obtaining insulator-coated black particles each of which has a denser and thicker electrical insulator coating, preferably, the step (1-e) of obtaining insulator-coated black particles is carried out as follows.

That is, after black particles are obtained by the above steps (1-a), (1-b), (1-c) and (1-d) or by the above steps (1-a), (1-b), (1-c2) and (1-d), the electrical insulator coating formed of a silica coating is increased in thickness by carrying out the processes of (a) dispersing the above black particles in an alcohol-based solvent consisting mainly of an intermediate alcohol, then adding an alkaline aqueous solution to the resultant dispersion to active the surface of each of the black particles, adding a silicon alkoxide or its partial hydrolyzate, hydrolyzing and dehydratively condensing the silicon alkoxide or its partial hydrolyzate to form a silica coating on the surface of each of the black particles and separating the resultant silica-coated black particles from the dispersion, and (b) dispersing the silica-coated black particles obtained in the above process (a) in a lower alcohol solvent, adding a quaternary ammonium salt which is an electrolyte in the resultant dispersion to dissolve the quaternary ammonium salt, then adding an alkaline aqueous solution and a silicon alkoxide or its partial hydrolyzate, and hydrolyzing and dehydratively condensing the silicon alkoxide or its partial hydrolyzate to form an additional silica coating on the silica coating of each of the above silica-coated black particles, wherey the intended insulator-coated black particles are obtained (the above step will be referred to as "step (1-e2)" hereinafter).

In the above process (a), first, the black particles obtained in the above step (1-d) are added to an alcohol-based solvent consisting mainly of an intermediate alcohol to obtain a dispersion, and then an alkaline aqueous solution is added to the above dispersion to activate the surfaces of the black particles. The intermediate alcohol used in the process (a) is selected from those which can be used in the above step (1-a), and the alkaline aqueous solution used in the process (a) is selected from those which can be used in the step (1-b). Further, the effects produced by the use of the intermediate alcohol and the alkaline aqueous solution are the same as those produced by the use of the intermediate alcohol and the alkaline aqueous solution in the step (1-b).

In the process (a), then, a silicon alkoxide or its partial hydrolyzate is added to the dispersion of the activated black particles, hydrolyzed and dehydratively condensed to form a silica coating on each of the black particles, and the resultant silica-coated black particles are separated from the dispersion to terminate the process (a). The silicon alkoxide used for forming the silica coating has the general formula, $Si(OR)_4$ or $Si(R')_n(OR)_{4-n}$ wherein each of R and R' is an alkyl group or an acyl group, particularly an alkyl group having 1 to 5 carbon atoms or an acyl group having 2 to 6 carbon atoms, and n is an integer of 1 to 3.

The partial hydrolyzate of silicon alkoxide includes a product obtained by partially hydrolyzing the titanium alkoxide of the above general formula.

The hydrolysis and dehydrative condensation of the silicon alkoxide or its partial hydrolyzate are generally carried out under conditions used in a general sol-gel method.

In the step (1-e2), after the above process (a), the process (b) is carried out. In the process (b), first, the silica-coated black particles obtained by the above process (a) are dispersed in a lower alcohol-based solvent, and a quaternary ammonium salt which is an electrolyte is added and dissolved. The lower alcohol-based solvent which is a dispersion medium includes methanol, ethanol and propanol. The quaternary ammonium salt, which is an electrolyte and is added to the dispersion and dissolved, is used for preventing the aggregation of the silica-coated black particles. For example, it is preferred to use a tetraalkylammonium salt of the general formula, $R_4N^+X^-$ wherein R is an alkyl group having, 1 to 4carbon atoms and X is an inorganic acid group, and it is particularly preferred to use a tetraalkylammonium tetrafluoroborate which is a salt of the above general formula in which the inorganic acid group X is $BF_4$.

The amount of the quaternary ammonium salt which is an electrolyte is preferably $1 \times 10^{-4}$ to 1 mol/liter, more preferably $5 \times 10^{-4}$ to $1 \times 10^{-1}$ mol/liter. When the above amount is less than $1 \times 10^{-4}$ to 1 mol/liter, the dispersing effect of the quaternary ammonium salt is hardly exhibited, and irreversible aggregate particles are formed so that it is difficult to obtain silica-coated black particles having monodisperse properties. When the above amount exceeds 1 mol/liter, shape-undefined, foreign matter-like coatings are liable to be formed, and the resultant silica-coated black particles are liable to be deformed in shape and have an increased CV value.

In the process (b), then, an alkaline aqueous solution and a silicon alkoxide or its partial hydrolyzate are added to the dispersion, and the silicon alkoxide or the partial hydrolyzate is dehydrated and dehydratively condensed to additionally form an electrical insulator coating formed of a silica coating on each of the above silica-coated black particles. The process (b) is so terminated. The silicon alkoxide or its partial hydrolyzate used for the additional formation of a silica coating can be selected from those explained in the above process (a).

In the above process (b), due to blackened titanium oxide coatings having electrical conductivity and due to silica coatings having insulation properties, the aggregation of the silica-coated black particles which are dielectric is prevented by the above quaternary ammonium salt which is an electrolyte. As a result, the additional formation of a silica coating by the hydrolysis and dehydrative condensation of the silicon alkoxide or its partial hydrolyzate proceeds very smoothly. Therefore, a thick and dense silica coating can be easily formed.

In the above step (1-e2), preferably, the process (b) is carried out 1 to 5 times after the process (a) is carried out once. In particular, a thicker and dense silica coating can be obtained by carrying out the process (b) a plurality of times. The insulator-coated black particles obtained by the above Process is excellent in electrical insulation properties and therefore can be more suitably used as a spacer for a liquid crystal display device. Namely, the insulator-coated black particles obtained by the above Process I of the present invention, shows a Y value of 0% in the XYZ system of colors defined in JIS Z8701 and have an electrical conductivity of $1\times10^{-10}$ S/cm or below. Further, according to the above Process I of the present invention, the insulator-coated black particles having a thickness of the black coating (blackened titanium oxide coating) of from 0.05 to 1 $\mu$m and a thickness of the electrical insulator coating of from 0.05 to 0.5 $\mu$m can be obtained. Therefore, the insulator-coated black particles obtained by the above Process I of the present invention is useful as a spacer for a liquid crystal display device.

Process II of the present invention will be explained hereinafter.

In the Process II, the step (2-a) of dispersing particles of a metal oxide in an alcohol-based solvent consisting mainly of an intermediate alcohol to obtain a dispersion of the particles, the step (2-b) of adding an alkaline aqueous solution to the above dispersion to activate the surface of each particle and the step (2-c) of forming a titanium oxide coating formed of $TiO_2$ on the surface of each particle whose surface has been activated are the same as those in the above Process I. The explanation thereof is therefore omitted.

Process II differs from Process I in that the electrical insulator coating is formed after the titanium oxide coating is blackened in Process I while the titanium oxide coating is blackened after the electrical insulator coating is formed on the surface of each of titanium oxide coatings in Process II.

That is, in Process II, after the above step (1-c) or the above step (1-c2), first, the step (2-d) of forming an electrical insulator coating on each titanium oxide coating surface is carried out. The kind and thickness of the electrical insulator coating to be formed and the conditions of forming the electrical insulator coating are the same as those in the step (1-e) or the step (1-e2) in Process I.

In process II, the titanium oxide coating is blackened by calcining the insulator-coated particles obtained in the above step (2-d) in a reducing and/or nitriding atmosphere in the step (2-e). The conditions of the above calcining treatment in a reducing and/or nitriding atmosphere are essentially the same as those in the step (1-d) in Process I. In the step (2-e) in Process II, however, the electrical insulator coating is present on the titanium oxide coating to be blackened, and the blackening of the titanium oxide coating by reduction and/or nitriding is performed by the inflow of a reducing and/or nitriding gas (e.g., ammonia gas) through the electrical insulator coating and the contact thereof to the titanium oxide coating. It is therefore necessary to consider the above point when the reducing and/or nitriding conditions are determined. In the step (2-e) in Process II, for example, the reduction with ammonia gas is preferably carried out for a longer period of time than in the step (1-d) in Process I.

As described above, Process II differs from Process I in that the titanium oxide coating is blackened after the electrical insulator coating is formed in Process II and that the electrical insulator coating is formed after the titanium oxide coating is blackened in Process I. However, the insulator-coated black particles obtained in Process II have such sufficient shading properties as those of the insulator-coated black particles obtained in Process I and have excellent electrical insulation properties, and therefore they can be suitably used as a spacer for a liquid crystal display device. Namely, the insulator-coated black particles obtained by the above Process II of the present invention, shows a Y value of 0% in the XYZ system of colors defined in JIS Z8701 and have an electrical conductivity of $1\times10^{-10}$ S/cm or below. Further, according to the above Process II of the present invention, the insulator-coated black particles having a thickness of the black coating (blackened titanium oxide coating) of from 0.05 to 1 $\mu$m and a thickness of the electrical insulator coating of from 0.05 to 0.5 $\mu$m can be obtained. Therefore, the insulator-coated black particles obtained by the above Process II of the p resent invention is useful as a spacer for a liquid crystal display device.

Process III of the present invention will be explained hereinafter.

Process III is a process for producing black particles, and comprises the steps of (3-a) dispersing particles of a metal oxide in an alcohol-based solvent consisting mainly of an intermediate alcohol to obtain a dispersion of the above particles, (3-b) adding an alkaline aqueous solution to the above dispersion to activate a surface of each of the above particles, (3-c) forming a titanium oxide coating of $TiO_2$ on the surface of each of the particles whose surfaces have been activated, to obtain titanium oxide-coated particles, and (3-d) calcining the above titanium oxide-coated particles in a reducing and/or nitriding atmosphere and thereby blackening the above titanium oxide coatings to obtain black particles.

In the above steps, the step (3-a) and the step (3-b) are the same as those in Process I or Process II. Further, the step (3-c) is the same as the step (1-c2) explained concerning Process I, and the step (3-d) is the same as the step (1-d) explained concerning Process I. The explanation of these steps is therefore omitted.

According to Process III of the present invention, there are obtained the following technical effects.

(i) A titanium oxide coating having a large thickness can be obtained due to the use of the alcohol-based solvent consisting mainly of an intermediate alcohol in the step (3-a) and due to the repetition of the steps (3-a), (3-b) and (3-c).

(ii) A densified and surface-flattened titanium oxide coating can be obtained due to the heat treatment in neutral water and the treatment under dry heat in the step (3-c).

(iii) When the above steps (3-a) to (3-c) are repeated to increase the thickness of the titanium oxide coating, since the titanium oxide coating is densified and surface-flattened, the cracking of the titanium oxide coating as an undercoating to cause the peeling of the titanium oxide coating is prevented when the particles are brought into contact with an alkaline aqueous solution in the step (3-b). Therefore, the titanium oxide coating can be easily increased in thickness.

(iv) Since the titanium oxide coating is densified and flattened, black particles having high monodisperse properties can be obtained (CV value (coefficient of variation) of particle diameter distribution is decreased).

The black particles having the above technical effects can be used as a material for insulator-coated black particles for use as a spacer for a liquid crystal display device or as a material for an anisotropic electrically conductive coating used for connecting a liquid crystal substrate and its driving LSI. Namely, the electrically conductive particles of the black particles obtained by the above Process III of the present invention show a Y value of 0% in the XYZ system of colors defined in JIS Z8701 and have an electrical conductivity of 70 S/cm or above. Therefore, the electrically conductive particles of the black particles obtained by the Process III of the present invention are suitably used to the above purposes.

The present invention will be explained with reference to Examples hereinafter.

EXAMPLE 1

(Preparation Example of Insulator-Coated Black Particles by Process I)

Step (1-a)

Monodisperse silica fine particles having an average particle diameter of 6.07 μm were used as spherical particles of a metal oxide, and n-butanol was used as an alcohol-based solvent. 1.46 Grams of the silica fine particles were added to 140 ml of n-butanol, and the mixture was exposed to ultrasonic wave for 30 minutes to obtain a dispersion of the silica fine particles.

Step (1-b)

0.5 Milliliter of 25% aqueous ammonia was dropwise added to, and mixed with, the above dispersion of the silica fine particles, and the mixture was stirred at 30° C. for 30 minutes to activate the surfaces of the silica fine particles.

Step (1-c)

Titanium tetrabutoxide was used as a titanium compound formable into titanium oxide. A solution of 5.45 g of the titanium tetrabutoxide in 20 ml of n-butanol was dropwise added to the dispersion obtained in the above step (1-b) over 10 minutes, and the mixture was stirred at 30° C. for 1 hour. Then, a solution of 8.14 ml of 0.5% aqueous ammonia in 20 ml of 2-propanol was dropwise added over 30 minutes, the reaction system was temperature-increased to 60° C. and stirred for 12 hours, and the hydrolysis of the titanium tetrabutoxide was terminated. After the reaction, the reaction mixture was allowed to stand to precipitate the particles, and a supernatant was removed by decantation. Further, the decantation was repeated with methanol and with water in this order, and the particles were freeze-dried to give silica fine particles having a thin coating of titanium oxide ($TiO_2$) (titanium oxide-coated spherical particles).

Step (1-d)

The freeze-dried titanium oxide-coated spherical particles were placed in a boat of quartz glass, the boat was set inside a furnace fusing tube formed of a quartz tube, and oxygen in the furnace fusing tube was purged with nitrogen gas. Then, the furnace temperature was increased at a temperature elevation rate of 200° C./hour, and at the point of time when the temperature reached 500° C., the furnace temperature was increased up to 850° C. while introducing ammonia gas at a flow rate of 250 ml/minute from a liquefied ammonia container. The furnace temperature was maintained at this temperature for 4 hours to complete the reducing and nitriding treatment, whereby the titanium oxide coatings were reduced and nitrided to form black coatings formed of partially reduced titanium oxide and titanium nitride. As a result, black spherical particles were obtained. The black spherical particles retained the monodisperse properties of the silica fine particles as matrix particles.

Further, the black coatings were measured for a composition by an X-ray photo-electron spectroscopy (XPS or ESCA). The conditions of the X-ray photo-electron spectroscopy were as follows.

Apparatus: ESCA-5400 supplied by ULVAC-PHI, INC.)
Degree of vacuum: $3-5\times10^{-9}$ Pa
X-ray source: MgKα (1,253.6 eV)
Analysis area: 1.1 mmφ
Photo-electron intake time: 1.0–10.0 min/element
Sputtering: Nil
Pass energy: 178.95 eV As a result, it was found that the average of n in the partially reduced titanium oxide $TiO_n$ was 1.75 and that $TiO_{1.75}$ and TiN were present in amount ratios of about 70% and about 30% respectively. Further, the black coatings were found to have a thickness of 0.05 μm on the basis of results of measurements of particle diameters with an electron microscope before and after the formation of the coatings.

Step (1-e)

5.00 Grams of the black spherical particles obtained in the step (1-d) were added to 63 ml of n-butanol and exposed to ultrasonic wave to disperse them, and then 0.30 ml of 25% aqueous ammonia was dropwise added. The mixture was stirred at 30° C. for 30 minutes to activate them. Then, a solution of 1.74 g of tetraethoxysilane in 20 ml of n-butanol was dropwise added over 10 minutes, and mixed with the dispersion at 30° C. for 1 hour. To this solution was dropwise added a solution of 3.70 g of 25% aqueous ammonia in 10 ml of 2-propanol over 30 minutes, and the mixture was stirred for 12 hours to complete the reaction.

After the reaction, the reaction mixture was allowed to stand to precipitate the particles, and a supernatant was removed by decantation. The decantation was repeated with methanol and with water in this order, and the particles were freeze-dried to give dry particles of black spherical particles whose surfaces were coated with electrical insulator coatings of silica (uncalcined insulator-coated black spherical particles).

The above-obtained dry particles were placed in a boat of quartz glass, the boat was set inside a furnace fusing tube formed of a quartz tube, and oxygen in the furnace fusing tube was purged with nitrogen gas. Then, the particles were temperature-increased at a temperature elevation rate of 200° C./hour, and at the point of time when the temperature reached 500° C., ammonia gas was introduced into the furnace fusing tube from a liquefied ammonia container for preventing re-oxidation of the black coatings. Further, the particles were temperature-increased up to 800° C. and maintained at this temperature for 4 hours.

The so-obtained insulator-coated black spherical particles were measured for an electrical conductivity to show excellent electrical insulation properties as excellent as $8.49\times10^{-12}$ S/cm.

Further, the above insulator-coated black spherical particles were black particles showing a Y value of 0% in the XYZ system of colors defined in JIS Z8701. The insulator-coated black spherical particles had black coatings having a thickness of 0.05 μm each on the silica matrix particles and silica coatings having a thickness of 0.10 μm each formed thereon, and retained the monodisperse properties of the matrix particles in a particle diameter distribution.

EXAMPLE 2

(Preparation Example of Insulator-Coated Black Spherical Particles by Process I)

Insulator-coated black spherical particles were obtained in the same manner as in the step (1-e) of Example 1 except that the calcining treatment of dry particles (uncalcined insulator-coated black spherical particles) was not carried out. The obtained particles were measured for an electrical conductivity to show excellent electrical insulation properties as excellent as $9.12 \times 10^{-11}$ S/cm. Further, the insulator-coated black spherical particles were black particles showing a Y value of 0% in the XYZ system of colors defined in JIS Z8701. The insulator-coated black spherical particles retained the monodisperse properties of the matrix particles in a particle diameter distribution.

The above insulator-coated black spherical particles contain many silanol groups on the surface of each since the silica coatings formed as electrical insulator coatings are not calcined. Owing to these silanol groups on the surfaces, therefore, the insulator-coated black spherical particles can be easily surface-treated with a silane coupling agent such as vinyltriethoxysilane, methacryloxypropyltrimethoxysilane, γ-aminopropyltriethoxysilane, methyltrimethoxysilane, methyltriethoxysilane, or the like. The insulator-coated black spherical particles therefore have characteristic features in that they can be improved in dispersibility by surface modification to make them suitable for the hydrophilic nature or the lipophilic nature of a solvent in which they are to be dissolved in the wet application of a spacer for a liquid crystal display device, that high flowability required of a powder in dry application can be imparted, and that they are graft-polymerized after introduction of reactive terminal groups so that they can be used for coating as a resin.

EXAMPLE 3

(Preparation Example of insulator-coated black spherical particles by Process I)

This Example used, as an alcohol-based solvent, t-amyl alcohol (2-methyl-2-butanol) in place of n-butanol used in Example 1. The details thereof are as follows.

Step (1-a)

Monodisperse silica fine particles having an average particle diameter of 6.77 μm were used as spherical particles of a metal oxide, and t-amyl alcohol was used as an alcohol-based solvent. 6.31 Grams of the silica fine particles were added to 140 ml of t-amyl alcohol, and the mixture was exposed to ultrasonic wave for 30 minutes to obtain a dispersion of the silica fine particles.

Step (1-b)

0.30 Milliliter of 25% aqueous ammonia was dropwise added to the above-obtained dispersion of the silica fine particles, and the mixture was stirred at 30° C. for 30 minutes to activate the surfaces of the silica fine particles.

Step (1-c)

Titanium tetrabutoxide was used as a titanium compound formable into titanium oxide. A solution of 5.45 g of the titanium tetrabutoxide in 20 ml of t-amyl alcohol was dropwise added to, and mixed with, the dispersion obtained in the above step (1-b) over 10 minutes, and the mixture was stirred at 30° C. for 1 hour. Then, a solution of 8.34 ml of 0.5% aqueous ammonia in 20 ml of 2-propyl alcohol was dropwise added over 30 minutes, then the reaction system was temperature-increased up to 60° C. and stirred for 12 hours, and the hydrolysis of the titanium tetrabutoxide was terminated. After the reaction, the reaction mixture was allowed to stand to precipitate the particles, and a supernatant was removed by decantation. The decantation was repeated with methanol and with water in this order, and then, the particles were freeze-dried to give silica fine particles having titanium oxide ($TiO_2$) coatings (titanium oxide-coated spherical particles).

Step (1-d)

The freeze-dried titanium oxide-coated spherical particles were placed in a boat of quartz glass, the boat was set inside a furnace fusing tube formed of a quartz tube, and oxygen in the furnace fusing tube was purged with nitrogen gas. Then, the furnace temperature was increased at a temperature elevation rate of 200° C./hour, and at the point of time when the temperature reached 500° C., the furnace temperature was increased up to 850° C. while introducing ammonia gas at a flow rate of 250 ml/minute from a liquefied ammonia container. The furnace temperature was maintained at this temperature for 4 hours, whereby the titanium oxide coatings were reduced and nitrided to form black coatings formed of partially reduced titanium oxide and titanium nitride. As a result, black spherical particles were obtained. The black spherical particles retained the monodisperse properties of the silica fine particles as matrix particles.

Further, the black coating were measured for a composition by an X-ray photo-electron spectroscopy (XPS or ESCA) to show nearly the same results as those in Example 1. The black coatings had a thickness of 0.05 μm.

Step (1-e)

4.00 Grams of the black spherical particles obtained in the step (1-d) were added to 63 ml of n-butanol and exposed to ultrasonic wave for 30 minutes to disperse them, and then 0.30 ml of 25% aqueous ammonia was dropwise added. The mixture was stirred at 30° C. for 60 minutes to activate them. Then, a solution of 1.74 g of tetraethoxysilane in 20 ml of n-butanol was dropwise added over 10 minutes, and the mixture was stirred at 30° C. for 1 hour. To this solution was dropwise added a solution of 3.70 g of 25% aqueous ammonia in 10 ml of 2-propanol over 30 minutes, and the mixture was stirred for 12 hours to complete the reaction.

After the reaction, the reaction mixture was allowed to stand to precipitate the particles, and a supernatant was removed by decantation. The decantation was repeated with methanol and with water in this order, and the particles were freeze-dried to give dry particles of black spherical particles whose surfaces were coated with electrical insulator coatings of silica (uncalcined insulator-coated black spherical particles).

The above-obtained dry particles were placed in a boat of quartz glass, the boat was set inside a furnace fusing tube formed of a quartz tube, and oxygen in the furnace fusing tube was purged with nitrogen gas. Then, the furnace temperature was increased at a temperature elevation rate of 200° C./hour, and at the point of time when the temperature reached 500° C., ammonia gas was introduced into the furnace fusing tube from a liquefied ammonia container. Further, the furnace temperature was increased up to 800° C. and maintained at this temperature for 4 hours.

The so-obtained insulator-coated black spherical particles were measured for an electrical conductivity to show 9.02× $10^{-12}$ S/cm or electrical insulation properties.

Further, the above insulator-coated black spherical particles were black particles showing a Y value of 0% in the XYZ system of colors defined in JIS Z8701. The insulator-coated black spherical particles had black coatings having a thickness of 0.05 μm each on the silica fine particles and silica coatings having a thickness of 0.10 μm each formed thereon, and retained the monodisperse properties of the silica fine particles as matrix particles in a particle diameter distribution.

EXAMPLE 4

(Preparation Example of insulator-coated black spherical particles by Process II)

Step (2-a)

Monodisperse silica fine particles having an average particle diameter of 6.07 μm were used as spherical particles of a metal oxide, and n-butanol was used as an alcohol-based solvent. 11.46 Grams of the silica fine particles were added to 140 ml of n-butanol, and the mixture was exposed to ultrasonic wave for 30 minutes to obtain a dispersion of the silica fine particles.

Step (2-b)

0.5 Milliliter of 25% aqueous ammonia was dropwise added to the above-obtained dispersion of the silica fine particles, and the mixture was stirred at 30° C. for 30 minutes to activate the surfaces of the silica fine particles.

Step (2-c)

Titanium tetrabutoxide was used as a titanium compound formable into titanium oxide. A solution of 5.45 g of the titanium tetrabutoxide in 20 ml of n-butanol was dropwise added to, and mixed with, the dispersion obtained in the above step (2-b) over 10 minutes, and the mixture was stirred at 30° C. for 1 hour. Then, a solution of 8.14 ml of 0.5% aqueous ammonia in 20 ml of 2-propyl alcohol was dropwise added over 30 minutes, then the reaction system was temperature-increased up to 60° C. and stirred for 12 hours, and the hydrolysis of the titanium tetrabutoxide was terminated. After the reaction, the reaction mixture was allowed to stand to precipitate the particles, and a supernatant was removed by decantation. The decantation was repeated with methanol and with water in this order, and then, the particles were freeze-dried to give silica fine particles having thin coatings of titanium oxide ($TiO_2$) (titanium oxide-coated spherical particles).

Step (2-d)

5.00 Grams of the freeze-dried titanium oxide-coated spherical particles were added to 63 ml of n-butanol, and the mixture was exposed to ultrasonic wave for 30 minutes to disperse the particles. Then, 0.30 ml of 25% aqueous ammonia was added, and the mixture was stirred at 30° C. for 30 minutes for activation. Then, a solution of 1.74 g of tetraethoxysilane in 20 ml of n-butanol was dropwise added over 10 minutes, and the mixture was stirred at 30° C. for 1 hour. To this solution was dropwise added a solution of 3.70 g of 25% aqueous ammonia in 10 ml of 2-propanol over 30 minutes, and the mixture was stirred for 12 hours to complete the reaction.

After the reaction, the reaction mixture was allowed to stand to precipitate the particles, and a supernatant was removed by decantation. The decantation was repeated with methanol and with water in this order, and then, the particles were freeze-dried to give dry particles having electrical insulator coatings of silica formed on the titanium oxide coating spherical particles (insulator-coated spherical particles).

Step (2-e)

The dry particles obtained in the step (2-d) were placed in a boat of quartz glass, the boat was set inside a furnace fusing tube formed of a quartz tube, and oxygen in the furnace fusing tube was purged with nitrogen gas. Then, the furnace temperature was increased at a temperature elevation rate of 200° C./hour, and at the point of time when the temperature reached 500° C., ammonia gas was introduced into the furnace fusing tube from a liquefied ammonia container, and the furnace temperature was further increased up to 850° C. The furnace temperature was maintained at this temperature for 6 hours, whereby the titanium oxide coatings constituting the dry particles (insulator-coated spherical particles) were reduced and nitrided to form black coatings. As a result, insulator-coated black spherical particles were obtained.

The so-obtained insulator-coated black spherical particles were measured for an electrical conductivity to show 8.49× $10^{-12}$ S/cm or electrical insulation properties.

Further, the above insulator-coated black spherical particles were black particles showing a Y value of 0% in the XYZ system of colors defined in JIS Z8701. The insulator-coated black spherical particles had coatings formed of silica coatings, and retained the monodisperse properties of the silica fine particles as matrix particles in a particle diameter distribution.

EXAMPLE 5

(Preparation Example of insulator-coated black spherical particles by Process I)

Step (1-a), step (1-b), step (1-c)

The above steps were carried out in the same manner as in Example 1.

Step (1-d)

The freeze-dried titanium oxide-coated spherical particles were placed in a boat formed of quartz glass, the boat was set in a furnace fusing tube in a hydrogen atmosphere reducing furnace, and oxygen in the furnace fusing tube was purged with nitrogen gas. The furnace temperature was increased at a temperature elevation rate of 200° C./hour, and at the point of time when the temperature reached 500° C., the furnace temperature was increased up to 900° C. while introducing hydrogen gas at a flow rate of 500 ml/minute. The furnace temperature was maintained at this temperature for 5 hours, whereby the titanium oxide coatings constituting the titanium oxide-coated spherical particles were partially reduced to form black coatings, and black spherical particles were obtained.

The black coatings were analyzed by X-ray photoelectron spectroscopy to show that of n in the partially reduced titanium oxide $TiO_n$ was 1.75.

Step (1-e)

5.0 Grams of the black spherical particles obtained in the step (1-d) were added to 63 ml of n-butanol and exposed to ultrasonic wave for 30 minutes to disperse them, and then 0.30 ml of 25% aqueous ammonia was dropwise added. The mixture was stirred at 30° C. for 30 minutes to activate them. Then, a solution of 1.74 g of tetraethoxysilane in 20 ml of n-butanol was dropwise added over 10 minutes, and mixed with the dispersion at 30° C. for 1 hour. To this solution was dropwise added a solution of 3.70 g of 25% aqueous ammonia in 10 ml of 2-propanol over 30 minutes, and the mixture was stirred for 12 hours to complete the reaction.

After the reaction, the reaction mixture was allowed to stand to precipitate the particles, and a supernatant was removed by decantation. The decantation was repeated with methanol and with water in this order, and then the particles were freeze-dried to give dry particles of the black spherical particles whose surfaces were coated with electrical insulator coatings of silica (insulator-coated black spherical particles).

The above-obtained dry particles were placed in a boat of quartz glass, the boat was set inside a furnace fusing tube in a hydrogen atmosphere reducing furnace, and oxygen in the furnace was purged with nitrogen gas. Then, the furnace temperature was increased at a temperature elevation rate of 200° C./hour, and at the point of time when the temperature reached 300° C., hydrogen gas was introduced at a flow rate of 500 ml/minute. Further, the furnace temperature was increased up to 800° C. and maintained at this temperature for 4 hours for the calcining, to give the intended insulator-coated black spherical particles.

The so-obtained insulator-coated black spherical particles were measured for an electrical conductivity to show excellent electrical insulation properties as excellent as $5.13 \times 10^{-13}$ S/cm.

Further, the above insulator-coated black spherical particles were black particles showing a Y value of 0% in the XYZ system of colors defined in JIS Z8701. The insulator-coated black spherical particles had partially reduced titanium oxide black coatings having a thickness of 0.05 $\mu$m each on the silica fine particles as matrix particles and silica coatings having a thickness of 0.1 $\mu$m each formed thereon, and retained the monodisperse properties of the silica fine particles as matrix particles in a particle diameter distribution.

EXAMPLE 6

(Preparation Example of insulator-coated black spherical particles by Process II)

Step (2-a), step (2-b), step (2-c), step (2-d)

The above steps were carried out in the same manner as in Example 4.

Step (2-e)

The dry particles (insulator-coated spherical particles) obtained in the step (2-d) were placed in a boat of quartz glass, the boat was set inside a furnace fusing tube in a hydrogen atmosphere reducing furnace, and oxygen in the furnace fusing tube was purged with nitrogen gas. Then, the furnace temperature was increased at a temperature elevation rate of 200° C./hour, and at the point of time when the temperature reached 500° C., hydrogen gas was introduced at a flow rate of 500 ml/minute, and the furnace temperature was furhter increased up to 900° C. The furnace temperature was maintained at this temperature for 5 hours, whereby the titanium oxide coatings constituting the insulator-coated spherical particles were partially reduced to form black coatings, and insulator-coated black spherical particles were obtained.

The so-obtained insulator-coated black spherical particles were measured for an electrical conductivity to show $9.23 \times 10^{-13}$ S/cm or electrical insulation properties.

Further, the above insulator-coated black spherical particles were black particles showing a Y value of 0% in the XYZ system of colors defined in JIS Z8701. The insulator-coated black spherical particles had partially reduced titanium oxide black coatings having a thickness of 0.05 $\mu$m each on the silica fine particles as matrix particles and further had silica coatings having a thickness of 0.1 $\mu$m each formed thereon. The insulator-coated black spherical particles retained the monodisperse properties of the silica fine particles as matrix particles in a particle diameter distribution.

EXAMPLE 7

(Preparation Example of black particles by Process III)

Step (3-a)

Monodisperse silica fine particles having an average particle diameter of 4.75 $\mu$m and a CV value (coefficient of variation) of 0.95% were used as spherical particles of a metal oxide, and n-butanol was used as an alcohol-based solvent. 52.8 Grams of the silica fine particles were added to 840 ml of n-butanol and exposed to ultrasonic wave for 30 minutes to obtain a dispersion of the silica fine particles.

Step (3-b)

3 Milliliters of 25% aqueous ammonia was added to, and mixed with, the above-obtained dispersion of the silica fine particles, and the mixture was stirred at 30° C. for 1 hour to activate the surfaces of the silica fine particles.

Step (3-c)

Titanium tetrabutoxide was used as a titanium compound formable into titanium oxide. A solution of 32.4 g of the titanium tetrabutoxide in 120 ml of n-butanol was dropwise added, and mixed with, the dispersion obtained in the above step (3-b) over 10 minutes, and the mixture was stirred at 30° C. for 1 hour. Then, a solution of 49 ml of 0.5% aqueous ammonia in 120 ml of 2-propanol was dropwise added over 30 minutes, and the reaction system was temperature-increased up to 60° C. and stirred for 2 hours. The reaction mixture was allowed to stand to precipitate the particles, and a supernatant was removed by decantation. The decantation was repeated with methanol once and with pure water three times, and then, the particles were dispersed in pure water. The resultant dispersion was temperature-increased to 70° C., and the hydrolysis was completed by maintaining the temperature for 1 hour, to form titanium oxide coatings free of unreacted substances on the surfaces of the silica fine particles. The dispersing solvent was changed from pure water to methanol by precipitation and decantation, and the methanol was evaporated.

Then, the above silica fine particles having titanium oxide coatings formed on their surfaces were treated under dry heat in an oven at 200° C. for 2 hours to densify and flatten the titanium oxide coatings, whereby silica fine particles having dense and flat-surface titanium oxide coatings (titanium oxide-coated spherical particles) were obtained. The obtained titanium oxide-coated spherical particles had an average particle diameter of 4.85 $\mu$m and a CV value of 1.22%, and the titanium oxide coatings had a thickness of 0.05 $\mu$m.

Then, 54 g of the titanium oxide-coated spherical particles having an average particle diameter of 4.85 $\mu$m and being in a monodisperse state, obtained through the above steps (3-a), (3-b) and (3-c), were used as a starting material, and the steps (3-a), (3-b) and (3-c) were repeated once each. However, the repeated step (3-c) differed from the step (3-c) carried out first in the following point. In the repeated procedures, in the step (3-c), a solution of 80 g of titanium tetrabutoxide in 240 ml of n-butanol was added to, and mixed with, the dispersion of the titanium oxide-coated spherical particles, and then a solution of 96 ml of 0.5% aqueous ammonia in 120 ml of 2-propanol was dropwise added.

The titanium oxide-coated spherical particles obtained by repeating the steps (3-a), (3-b) and (3-c) had an average particle diameter of 5.09 μm and a CV value of 1.35%, and the titanium oxide coatings had a thickness of 0.17 μm.

FIG. 1 is a schematic showing of an SEM photograph of the obtained titanium oxide-coated spherical particles. As shown in FIG. 1, in the titanium oxide-coated spherical particles obtained in this Example, each titanium oxide coating had a large thickness, while almost no peeling of titanium oxide coatings was observed. This is because the titanium oxide coatings were intimately bonding to the silica fine particles since they were densified and flattend by the heat treatment in water and the treatment under dry heat in the step (3-c).

Figure 2:
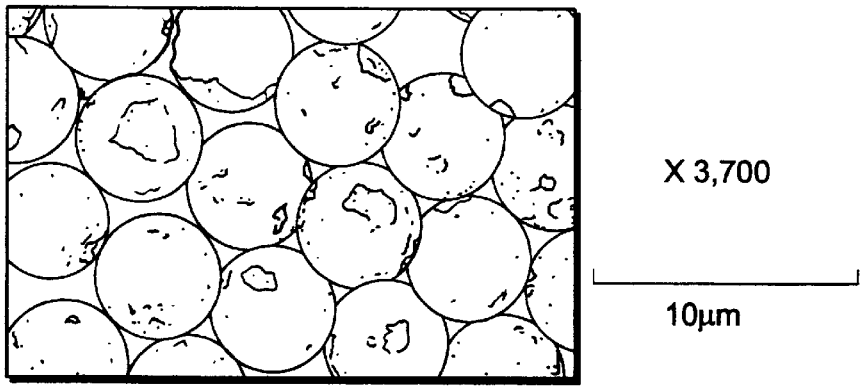
FIG. 2 is a schematic showing of a scanning electron microscope (SEM) photograph of a comparative product with regard to the titanium oxide-coated particles obtained in Example 7 to be described later.

For comparison, FIG. 2 is a schematic showing of an SEM photograph of titanium oxide-coated silica fine particles which were obtained in the same manner as in Example 7 except that the heat treatment in water and the treatment under dry heat were not carried out. As shown in FIG. 2, in the titanium oxide-coated silica fine particles obtained without the heat treatment in water and the treatment under dry heat, the titanium oxide coatings are poor in denseness and surface flatness, and they showed peelings of coatings to a by far greater extent than those of the present invention.

Figure 3:
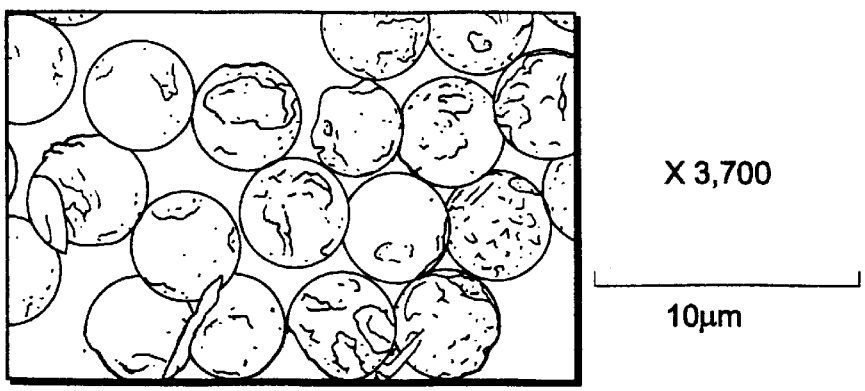
FIG. 3 is a schematic showing of a scanning electron microscope (SEM) photograph of another comparative product with regard to the titanium oxide-coated particles obtained in Example 7 to be described later.

FIG. 3 is a schematic showing of an SEM photograph of spherical particles obtained by carrying out neither the heat treatment in water nor the treatment under dry heat in the step (3-c) carried out first and adding an alkaline aqueous solution for forming a titanium oxide coating for the second time in the step (3-b). FIG. 3 shows that the titanium oxide coatings were exceedingly peeled and that some titanium oxide coatings were peeled off.

Step (3-d)

40 Grams of the titanium oxide-coated spherical particles obtained in the step (3-c) were placed in a boat formed of quartz glass. The boat was placed in a furnace fusing tube formed of quartz glass tube having a gas inlet on one end and a gas outlet on the other end and having an internal diameter of 40 mm, and oxygen in the furnace fusing tube was purged with nitrogen gas. Then, while nitrogen gas was introduced into the furnace at a flow rate of 1 liter/minute, the furnace temperature was elevated up to 200° C. over 1 hour. Then the gas inlet was switched to hydrogen gas, and while hydrogen gas was introduced at a flow rate of 1 liter/minute, the furnace temperature was elevated up to 900° C. over 3 hours, this temperature was maintained for 5 hours, and the temperature was decreased to 500° C. over 4 hours. At this point of time, the gas inlet was switched to nitrogen gas, and while nitrogen gas was introduced at the same flow rate, the furnace temperature was decreased to room temperature over 4 hours, to give black spherical particles. The so-obtained black spherical particles have an electrical conductivity of 70.0 S/cm.

EXAMPLE 8

(Preparation Example of black spherical particles by Process III)

Step (3-a), step (3-b) step (3-c)

In the above Example 7, the procedures of forming a titanium oxide coating were carried out twice, while the procedures of forming a titanium oxide coating were carried out three times in this Example.

The procedures of producing a titanium oxide coating were carried out basically in the same manner as in Example 7, and their detailed explanations are therefore omitted. The kinds and amounts of silica fine particles, titanium alkoxide, a solvent, and alkaline aqueous solution used and the physical properties of titanium oxide-coated spherical particles obtained in the step (3-c) were as described below.

(1) Procedure of forming titanium oxide coating for the first time

| Step (3-a) | |
|---|---|
| Monodisperse silica fine particles (average particle diameter 4.97 μm, CV value 0.98%) | 92 g |
| n-Butanol | 500 ml |
| Step (3-b) | |
| 25% Aqueous ammonia | 2.3 ml |
| Step (3-c) | |
| Titanium tetrabutoxide | 45.9 g |
| n-Butanol | 400 ml |
| 0.5% Aqueous ammonia | 48.6 g |
| 2-Propanol | 169 ml |

Physical properties of obtained titanium oxide-coated spherical particles

| Average particle diameter after drying at 200° C. | 5.11 μm |
|---|---|
| CV value | 1.08% |
| Thickness of titanium oxide coating | 0.07 μm |

(2) Procedures of forming titanium oxide coating for the second time

| Step (3-a) | |
|---|---|
| Titanium oxide-coated spherical particles (average particle diameter 5.11 μm, CV value 1.08%) | 93.8 g |
| n-Butanol | 500 ml |
| Step (3-b) | |
| 25% Aqueous ammonia | 2.3 ml |
| Step (3-c) | |
| Titanium tetrabutoxide | 25.0 g |
| n-Butanol | 400 ml |
| 0.5% Aqueous ammonia | 48.6 g |
| 2-Propanol | 169 ml |

Physical properties of obtained titanium oxide-coated spherical particles

| Average particle diameter after drying at 200° C. | 5.27 μm |
|---|---|
| CV value | 1.12% |
| Thickness of titanium oxide coating | 0.15 μm |

(3) Procedures of forming titanium oxide coating for the third time

| Step (3-a) | |
| --- | --- |
| Titanium oxide-coated spherical particles | 90.0 g |
| n-Butanol | 500 ml |
| Step (3-b) | |
| 25% Aqueous ammonia | 2.3 ml |
| Step (3-c) | |
| Titanium tetrabutoxide | 25.0 g |
| n-Butanol | 400 ml |
| 0.5% Aqueous ammonia | 48.6 g |
| 2-Propanol | 169 ml |

Physical properties of obtained titanium oxide-coated spherical particles

| | |
| --- | --- |
| Average particle diameter after drying at 200° C. | 5.55 µm |
| CV value | 1.19% |
| Thickness of titanium oxide coating | 0.29 µm |

When the procedures of forming a titanium oxide coating were carried out three times, there were obtained titanium oxide-coated spherical particles whose monodisperse titanium oxide coatings had a thickness of as large as 0.29 µm, were dense and had a small CV value.

Step (3-d)

The titanium oxide-coated spherical particles obtained in the step (3-c) were calcined in a nitrogen gas atmosphere under the same conditions as those in Example 7, to give black spherical particles. The so-obtained black spherical particles have an electrical conductivity of 90.0 s/cm.

EXAMPLE 9

(Preparation Example of insulator-coated black spherical particles by Process II)

Step (2-a), step (2-b), step (2-c)

Titanium oxide-coated spherical particles were obtained under the same conditions as those in the steps (3-a), (3-b) and (3-c) in Example 7.

Step (2-d)

Process (a)

54.9 Grams of the titanium oxide-coated spherical particles having an average particle diameter of 5.09 µm, a CV value of 1.35% and a titanium oxide coating thickness of 0.17 µm, obtained in the step (2-c), were dispersed in 400 ml of n-butanol by ultrasonic treatment carried out for 30 minutes, and a solution of 1.38 ml of 25% aqueous ammonia in 520 ml of n-butanol was dropwise added to, and mixed with, the dispersion. The mixture was stirred at 30° C. for 60 minutes to activate particle surfaces. A solution of 24 g of tetraethoxysilane in 230 ml of isopropyl alcohol was dropwise added over 10 minutes, and the mixture was stirred at 30° C. for 60 minutes. To this solution was dropwise added a solution of 16.6 g of 25% aqueous ammonia in 144 ml of isopropyl alcohol over 30 minutes, and the mixture was stirred and allowed to react for 12 hours. The reaction mixture was allowed to stand to precipitate the particles, a supernatant was removed by decantation, and the decantation was repeated with methanol and with water in this order, to give titanium oxide-coated and silica-coated spherical particles having a silica coating as an electrical insulator coating on the surfaces thereof. The titanium oxide-coated and silica-coated spherical particles had an average particle diameter of 5.16 µm and a CV value of 1.35%.

Process (b)

For further increasing the thickness of the silica coating, the hydrolysis of silicon alkoxide in a dispersion of the titanium oxide-coated and silica-coated spherical particles obtained in the above Process (a) in a lower alcohol was carried out as follows.

That is, 55 g of the above titanium oxide-coated and silica-coated spherical particles were used as a starting material. The starting material was dispersed in 1,000 ml of methanol by 30 minutes' ultrasonic treatment, and to this dispersion was added 1.93 g of tetrabutylammonium tetrafluoroborate ($(C_4H_9)_4NBF_4$) which was a quaternary ammonium salt soluble in methanol as an electrolyte. To this dispersion were added 778 ml of methanol and 836 g of 25% aqueous ammonia, and the mixture was stirred for 60 minutes. Then, 71.1 g of tetraethoxysilane was added over 20 minutes, and then the mixture was further stirred at 30° C. for 12 hours. The reaction mixture was allowed to stand to precipitate the particles, and a supernatant portion containing newly formed fine particles was classified and removed by decantation. Further, purewater was added, and the decantation was repeated, to give insulator-coated (silica-coated) spherical particles having an average particle diameter of 5.30 µm and a CV value of 1.52%.

The insulator-coated spherical particles having an average particle diameter of 5.30 µm, obtained in the above Process (b) were used as a starting material, and the same procedures as those in Process (b) were further repeated twice, to give, as an end product, insulator-coated spherical particles each of which had a three-layered structure in which a titanium oxide coating was formed on the silica fine particle and silica coatings coated on the titanium oxide coating, and having an average particle diameter of 5.84 µm and a CV value of 1.70%. The outermost silica coatings had a thickness of 0.38 µm.

Step (2-e)

40 Grams of the insulator-coated spherical particles having the three-layered structure of silica, titanium oxide and silica, obtained in the above step (2-d), were placed in a boat formed of quartz glass. The boat was placed in a furnace fusing tube formed of quartz glass tube having a gas inlet on one end and a gas outlet on the other end and having an internal diameter of 40 mm, and oxygen in the furnace fusing tube was purged with nitrogen gas. Then, while nitrogen gas was introduced into the furnace at a flow rate of 1 liter/minute, the furnace temperature was elevated up to 200° C. over 1 hour. Then the gas inlet was switched to hydrogen gas, and while hydrogen gas was introduced at a flow rate of 1 liter/minute, the furnace temperature was elevated up to 900° C. over 3 hours, this temperature was maintained for 5 hours, and the temperature was decreased to 500° C. over 4 hours. At this point of time, the gas inlet was again switched to nitrogen gas, and while nitrogen gas was introduced at the same flow rate, the furnace temperature was decreased to room temperature over 4 hours, to give insulator-coated black spherical particles. The insulator-coated black spherical particles had an average particle diameter of 5.59 µm and a coefficient of variation (CV value) of 1.9%.

EXAMPLE 10

(Preparation Example of insulator-coated black spherical particles by Process II)

Step (2-a)

Monodisperse silica fine particles having an average particle diameter of 4.75 µm and a CV value of 1.05 were used as spherical particles of a metal oxide, and n-butanol was used as an alcohol-based solvent. 52.8 Grams of the silica fine particles were added to 840 ml of n-butanol, and the mixture was exposed to ultrasonic wave for 30 minutes to obtain a dispersion of the silica fine particles.

Step (2-b)

3 Milliliters of 25% aqueous ammonia was dropwise added to, and mixed with, the above-obtained dispersion of the silica fine particles, and the mixture was stirred at 30° C. for 1 hour to activate the surfaces of the silica fine particles.

Step (2-c)

Titanium tetrabutoxide was used as a titanium compound formable into titanium oxide. A solution of 32.4 g of titanium tetrabutoxide in 120 ml of n-butanol was dropwise added over 10 minutes to the dispersion obtained in the above step (2-b), and the mixture was stirred at 30° C. for 1 hour. Then, a solution of 49 ml of 0.5% aqueous ammonia in 120 ml of 2-propanol was dropwise added over 30 minutes, and then the reaction system was temperature-increased up to 60° C. and stirred for 2 hours. The reaction mixture was allowed to stand to precipitate the particles, and a supernatant was removed by decantation. The decantation was repeated with methanol once and with pure water three times, and then, the particles were dispersed in pure water. The resultant dispersion was temperature-increased to 70° C., and the hydrolysis was completed by maintaining the temperature for 1 hour, to form titanium oxide coatings free of unreacted substances on the surfaces of the silica fine particles. The dispersing solvent was changed from pure water to methanol by precipitation and decantation, and the methanol was evaporated.

Then, the above silica fine particles having titanium oxide coatings formed on their surfaces were treated under dry heat in an oven at 200° C. for 2 hours to densify and flatten the titanium oxide coatings, whereby silica fine particles having dense and flat-surface titanium oxide coatings (titanium oxide-coated spherical particles) were obtained. The obtained titanium oxide-coated spherical particles had an average particle diameter of 4.85 $\mu$m and a CV value of 1.20%, and the titanium oxide coatings had a thickness of 0.05 $\mu$m.

Then, 54 g of the titanium oxide-coated spherical particles having an average particle diameter of 4.85 $\mu$m and being in a monodisperse state, obtained through the above steps (2-a), (2-b) and (2-c), were used as a starting material, and the steps (2-a), (2-b) and (2-c) were repeated once each. However, the repeated step (2-c) differed from the step (2-c) carried out first in the following point. In the repeated procedures, in the step (2-c), a solution of 80 g of titanium tetrabutoxide in 240 ml of n-butanol was added to, and mixed with, the dispersion of the titanium oxide-coated spherical particles, and then a solution of 96 ml of 0.5% aqueous ammonia in 120 ml of 2-propanol was dropwise added.

The titanium oxide-coated spherical particles obtained by repeating the steps (2-a), (2-b) and (2-c) had an average particle diameter of 5.09 $\mu$m and a CV value of 1.28%, and the titanium oxide coatings had a thickness of 0.17 $\mu$m.

Step (2-d)

Process (a)

54.9 Grams of the titanium oxide-coated spherical particles having an average particle diameter of 5.09 $\mu$m and a titanium oxide coating thickness of 0.17 $\mu$m, obtained by repeating the steps (2-a), (2-b) and (2-c), were dispersed in 400 ml of n-butanol by ultrasonic treatment carried out for 30 minutes, and a solution of 1.38 ml of 25% aqueous ammonia in 520 ml of n-butanol was dropwise added. The mixture was stirred at 30° C. for 60 minutes to activate particle surfaces. Then, a solution of 24 g of tetraethoxysilane in 230 ml of isopropyl alcohol was dropwise added over 10 minutes, and the mixture was stirred at 30° C. for 60 minutes. To this solution was dropwise added a solution of 16.6 g of 25% aqueous ammonia in 144 ml of isopropyl alcohol over 30 minutes, and the mixture was stirred and allowed to react for 12 hours. The reaction mixture was allowed to stand to precipitate the particles, a supernatant was removed by decantation, and the decantation was repeated with methanol and with water in this order, to give titanium oxide-coated and silica-coated spherical particles having a silica coating as an electrical insulator coating on the surfaces thereof. The titanium oxide-coated and silica-coated spherical particles had an average particle diameter of 5.16 $\mu$m and a CV value of 1.35%.

Process (b)

For further increasing the thickness of the silica coating, the hydrolysis of silicon alkoxide in a dispersion of the titanium oxide-coated and silica-coated spherical particles obtained in the above process (a) in a lower alcohol was carried out as follows.

That is, 55 g of the above titanium oxide-coated and silica-coated spherical particles were used as a starting material. The starting material was dispersed in 1,000 ml of methanol by 30 minutes' ultrasonic treatment, and to this dispersion was added 1.93 g of tetrabutylammonium tetrafluoroborate (($C_4H_9$)$_4$$NBF_4$) which was a quaternary ammonium salt soluble in methanol as an electrolyte. To this dispersion were added 778 ml of methanol and 836 g of 25% aqueous ammonia, and the mixture was stirred for 60 minutes. The electrolyte concentration at this time was $2.2 \times 10^{-3}$ mol/liter. Then, 71.1 g of tetraethoxysilane was added over 20 minutes, and then the mixture was further stirred at 30° C. for 12 hours. The reaction mixture was allowed to stand to precipitate the particles, and a supernatant portion containing newly formed fine particles was classified and removed by decantation. Further, pure water was added, and the decantation was repeated, to give insulator-coated (silica-coated) spherical particles having an average particle diameter of 5.30 $\mu$m and a CV value of 1.39%.

The insulator-coated spherical particles having an average particle diameter of 5.30 $\mu$m, obtained in the above Process (b), were used as a starting material, and the same procedures as those in Process (b) were further repeated twice. The procedures were repeated for the first time to give spherical particles each of which had a three-layered structure in which a titanium oxide coating was formed on the silica fine particle and a silica coating coated thereon, and having an average particle diameter of 5.52 $\mu$m and a CV value of 1.41%. The above procedures were repeated for the second time to finally give spherical particles having an average particle diameter of 5.84 $\mu$m and a CV value of 1.55%. The outermost silica coatings had a thickness of 0.38 $\mu$m. The so-formed electrical insulator coating (silica coating) had a large thickness and was dense as compared with conventional ones, and the electrical insulator coating was excellent in electrical insulation properties.

Step (2-e)

40 Grams of the insulator-coated spherical particles having the three-layered structure of silica, titanium oxide and silica, obtained in the above step (2-d), were placed in a boat formed of quartz glass. The boat was placed in a furnace fusing tube formed of a quartz glass tube having a gas inlet on one end and a gas outlet on the other end and having an internal diameter of 40 mm, and oxygen in the furnace fusing tube was purged with nitrogen gas. Then, while nitrogen gas was introduced into the furnace at a flow rate of 1 liter/minute, the furnace temperature was elevated up to 200° C. over 1 hour. Then the gas inlet was switched to hydrogen gas, and while hydrogen gas was introduced at a flow rate of 1 liter/minute, the furnace temperature was elevated up to 900° C. over 3 hours, this temperature was maintained for 5 hours, and the temperature was decreased to 500° C. over 4 hours. At this point of time, the gas inlet was again switched to nitrogen gas, and while nitrogen gas was introduced at the same flow rate, the furnace temperature was decreased to room temperature over 4 hours, to give insulator-coated black spherical particles. The insulator-coated black spherical particles had an average particle diameter of 5.59 µm and a CV value of 1.9%.

EXAMPLE 11

(Preparation Example of insulator-coated black spherical particles by Process II)

In the above Example 10, the process (b) in the step (2-d) was carried out three times, while the process (b) in the step (2-d) was carried out once in this Example. The other preparation procedures and conditions were similar to those in Example 10, and the essential points alone will be described below.

Step (2-a), step (2-b) and step (2-c)

Titanium oxide-coated spherical particles having an average particle diameter of 5.75 µm, a CV value of 1.22% and a titanium oxide coating thickness of 0.06 µm were obtained in the same manner as in the steps (2-a), (2-b) and (2-c) in Example 10 except that monodisperse silica fine particles having an average particle diameter of 5.63 µm and a CV value of 1.06 were used.

Step (2-d)

Process (a)

56.5 Grams of the titanium oxide-coated spherical particles having an average particle diameter of 5.75 µm, a CV value of 1.22% and a titanium oxide coating thickness of 0.06 µm, obtained by carrying out the steps (2-a), (2-b) and (2-c), were dispersed in 720 ml of n-butanol by ultrasonic treatment carried out for 30 minutes, and then a solution of 1.6 g of 25% aqueous ammonia in 180 ml of 2-propanol was dropwise added. The mixture was stirred at 30° C. for 60 minutes to activate particle surfaces. Then, a solution of 18.7 g of tetraethoxysilane in 144 ml of n-butanol was dropwise added over 30 minutes, and the mixture was stirred at 30° C. for 60 minutes. To this solution was dropwise added a solution of 13.0 g of 25% aqueous ammonia in 113 ml of 2-propanol over 30 minutes, and the mixture was stirred and allowed to react for 12 hours. The reaction mixture was allowed to stand to precipitate the particles, a supernatant was removed by decantation, and the decantation was repeated with methanol and with water in this order, to give titanium oxide-coated and silica-coated spherical particles having a silica coating as an electrical insulator coating on the surfaces thereof. The titanium oxide-coated and silica-coated spherical particles had an average particle diameter of 5.80 µm and a CV value of 1.33%. The electrical insulator coating (silica coating) had a thickness of 0.05 µm.

Process (b)

For further increasing the thickness of the silica coating, the hydrolysis of silicon alkoxide in a dispersion of the titanium oxide-coated and silica-coated spherical particles obtained in the above process (a) in a lower alcohol was carried out as follows.

That is, 57.0 g of the above titanium oxide-coated and silica-coated spherical particles were used as a starting material. The starting material was dispersed in 579 ml of methanol by 30 minutes' ultrasonic treatment, and to this dispersion was added 2.34 g of tetraethylammonium tetrafluoroborate (($C_2H_5$)$_4$NBF$_4$) which was a quaternary ammonium salt soluble in methanol as an electrolyte. To this dispersion were added 500 ml of methanol and 520 g of 25% aqueous ammonia, and the mixture was stirred for 60 minutes. The electrolyte concentration at this time was $6.5 \times 10^{-3}$ mol/liter. Then, 57 g of tetraethoxysilane was added over 20 minutes, and then the mixture was further stirred at 30° C. for 12 hours. The reaction mixture was allowed to stand to precipitate the particles, and a supernatant portion containing newly formed fine particles was classified and removed by decantation. Further, pure water was added, and the decantation was repeated, to give insulator-coated (silica-coated) spherical particles having an average particle diameter of 6.31 µm and a CV value of 1.86%. The silica coating had a thickness of 0.26 µm. The so-formed electrical insulator coating (silica coating) had a large thickness and was dense as compared with conventional ones, and the electrical insulator coating was excellent in electrical insulation properties.

Step (2-e)

The insulator-coated spherical particles obtained in the above step (2-d) were calcined under the same calcining conditions as those in Example 10, to give insulator-coated black spherical particles. The obtained insulator-coated black spherical particles had an average particle diameter of 6.18 µm and a CV value of 1.78%.

What is claimed is:

1. A process for the production of insulator-coated black particles, which comprises the steps of
   (1-a) dispersing particles of silica or a metal oxide in an alcohol-based solvent consisting mainly of an intermediate alcohol to obtain a dispersion of the above particles;
   (1-b) adding an alkaline aqueous solution to the dispersion obtained in step (1-a) to activate a surface of each of the metal oxide particles;
   (1-c) forming a titanium oxide coating of $TiO_2$ on the surface of each of the particles whose surfaces have been activated in the above step, to obtain titanium oxide-coated particles;
   (1-d) calcining the titanium oxide-coated particles obtained in the above step in a reducing and/or nitriding atmosphere and thereby blackening the above titanium oxide coatings to obtain black particles; and
   (1-e) forming an electrical insulator coating on a surface of each of the black particles obtained in the above step, to obtain insulator-coated black particles;
   wherein step (1-c) is carried out by adding a titanium alkoxide or its partial hydrolyzate to the dispersion of the particles whose surfaces have been activated in the above step (1-b), hydrolyzing and dehydratively condensing the titanium alkoxide or the partial hydrolyzate to form a titanium oxide coating on each of the above particles, separating the resultant titanium oxide-coated particles from the above dispersion, dispersing them in neutral water, heat-treating them, then, separating the titanium oxide-coated particles from the above neutral water and treating them under dry heat.

2. The process of claim 1, wherein the heat-treating in neutral water in the step (1-c) is carried out in pure water at a temperature of 50 to 90° C. and the treatment under dry heat in the step (1-c) is carried out at a temperature of 150 to 250° C.

3. The process of claim 1, wherein the titanium oxide-coated particles obtained through the step (1-a), the step (1-b) and the step (1-c) are used as a starting material, and the step (1-a), the step (1-b) and the step (1-c) are repeated once or at least twice each.

4. The process of claim 1, wherein the step (1-e) comprises the processes of
   (a) dispersing the black particles obtained in the step (1-d) in an alcohol-based solvent consisting mainly of an intermediate alcohol, then adding an alkaline aqueous solution to the resultant dispersion to active the surface of each of the black particles, adding a silicon alkoxide or its partial hydrolyzate, hydrolyzing and dehydratively condensing the silicon alkoxide or its partial hydrolyzate to form a silica coating on the surface of each of the black particles, and separating the silica-coated black particles from the dispersion, and
   (b) dispersing the silica-coated black particles obtained in the above process (a) in a lower alcohol solvent, adding a quaternary ammonium salt which is an electrolyte in the resultant dispersion to dissolve the quaternary ammonium salt, then adding an alkaline aqueous solution and a silicon alkoxide or its partial hydrolyzate, and hydrolyzing and dehydratively condensing the silicon alkoxide or its partial hydrolyzate to form an additional silica coating on the silica coating of each of the above silica-coated black particles,
   the above processes (a) and (b) being carried out to increase the electrical insulator coating formed of the silica coating in thickness.

5. The process of claim 4, wherein in the step (1-e), the process (a) is carried out once, and then the process (b) is carried out 1 to 5 times.

6. The process of claim 4, wherein the quaternary ammonium salt used in the step (1-e) is a tetraalkylammonium salt of the general formula, $R_4N^+X^-$ wherein R is an alkyl group having 1 to 4 carbon atoms and X is an inorganic acid group.

7. A process for the production of insulator-coated black particles, which comprises the steps of:
   (2-a) dispersing particles of silica or a metal oxide in an alcohol-based solvent consisting mainly of an intermediate alcohol to obtain a dispersion of the above particles;
   (2-b) adding an alkaline aqueous solution to the dispersion obtained in step (2-a) to activate a surface of each of the metal oxide particles;
   (2-c) forming a titanium oxide coating of $TiO_2$ on the surface of each of the particles whose surfaces have been activated in the above step, to obtain titanium oxide-coated particles;
   (2-d) forming an electrical insulator coating on a surface of each of the titanium oxide-coated particles obtained in the above step, to obtain insulator-coated particles; and
   (2-e) calcining the insulator-coated particles obtained in the above step in a reducing and/or nitriding atmosphere and thereby blackening the above titanium oxide coatings constituting the insulator-coated particles, to obtain insulator-coated black particles;

wherein step (2-c) is carried out by adding the titanium alkoxide or its partial hydrolyzate to the dispersion of the particles whose surfaces have been activated in the above step (2-b), hydrolyzing and dehydratively condensing the titanium alkoxide or the partial hydrolyzate to form a titanium oxide coating on each of the above particles, separating the resultant titanium oxide-coated particles form the above dispersion, dispersing them in neutral water, heat-treating them, then, separating the titanium oxide-coated particles from the above neutral water and treating them under dry heat.

8. The process of claim 7, wherein the heat-treating in neutral water in the step (2-c) is carried out in pure water at a temperature of 50 to 90° C. and the treatment under dry heat in the step (2-c) is carried out at a temperature of 150 to 250° C.

9. The process of claim 7, wherein the titanium oxide-coated particles obtained through the step (2-a), the step (2-b) and the step (2-c) are used as a starting material, and the step (2-a), the step (2-b) and the step (2-c) are repeated once or at least twice each.

10. The process of claim 7, wherein the step (2-d) comprises the processes of
    (a) dispersing the titanium oxide-coated black particles obtained in the step (2-c) in an alcohol-based solvent consisting mainly of an intermediate alcohol, then adding an alkaline aqueous solution to the resultant dispersion to active the surface of each of the titanium oxide-coated black particles, adding a silicon alkoxide or its partial hydrolyzate, hydrolyzing and dehydratively condensing the silicon alkoxide or its partial hydrolyzate to form a silica coating on the surface of each of the titanium oxide-coated black particles, and separating the resultant titanium oxide-coated and silica-coated particles from the dispersion, and
    (b) dispersing the titanium oxide-coated and silica-coated black particles obtained in the above process (a) in a lower alcohol solvent, adding a quaternary ammonium salt which is an electrolyte in the resultant dispersion to dissolve the quaternary ammonium salt, then adding an alkaline aqueous solution and a silicon alkoxide or its partial hydrolyzate, and hydrolyzing and dehydratively condensing the silicon alkoxide or its partial hydrolyzate to form an additional silica coating on the silica coating of each of the above titanium oxide-coated and silica-coated black particles,
    the above processes (a) and (b) being carried out to increase the electrical insulator coating formed of the silica coating in thickness.

11. The process of claim 10, wherein in the step (2-d), the process (a) is carried out once, and then the process (b) is carried out 1 to 5 times.

12. The process of claim 10, wherein the quaternary ammonium salt used in the step (2-d) is a tetraalkylammonium salt of the general formula, $R_4N^+X^-$ wherein R is an alkyl group having 1 to 4 carbon atoms and X is an inorganic acid group.

13. A spacer for a liquid crystal display device which comprises insulator-coated black particles showing a Y value of 0% in the XYZ system of colors defined in JIS Z8701 and having an electrical conductivity of $1 \times 10^{-10}$ S/cm or below obtained by the process of claim 1 or claim 7.

14. The spacer for a liquid crystal display device according to claim 13, wherein the insulator-coated black particles have a thickness of the blackened titanium oxide coating of from 0.05 to 1 $\mu$m.

15. The spacer for a liquid crystal display device according to claim 13, wherein the insulator-coated black particles have a thickness of the electrical insulator coating of from 0.05 to 0.5 $\mu$m.

* * * * *